Feb. 26, 1957 R. G. PIETY 2,783,448
FILTER FOR SEISMIC AMPLIFIER
Filed Sept. 29, 1950 2 Sheets-Sheet 1

INVENTOR.
R. G. PIETY
BY
*Hudson & Young*
ATTORNEYS

United States Patent Office 2,783,448
Patented Feb. 26, 1957

2,783,448

FILTER FOR SEISMIC AMPLIFIER

Raymond G. Piety, Bartlesville, Okla., assignor to Phillips Petroleum Company, a corporation of Delaware Application September 29, 1950, Serial No. 187,635

2 Claims. (Cl. 340—15)

This invention relates to a tuning system for seismometers. In one specific aspect, it relates to the provision of a band elimination filter in the electrical circuits of a seismic prospecting system.

In seismic prospecting, an explosive charge is detonated at a location referred to as the shot point, this detonation producing seismic waves which are transmitted through the earth to a plurality of seismometers spaced from the shot point, these seismometers producing electrical voltages representative of the seismic waves incident thereon, which voltages are fed to a common recorder. A portion of the seismic waves from the shot point penetrate the earth and are reflected and refracted from the subterranean strata. These waves, which have a dominant frequency in the range of 30 to 70 cycles per second, provide useful information concerning the subterranean strata from which they are reflected or refracted. Another portion of the seismic waves produced at the shot point are absorbed and do not reach the seismometers. Still another portion of the seismic waves traverse the surface of the earth and produce undesirable electrical voltages at the seismometer stations. These surface waves, which are sometimes referred to as ground roll or Rayleigh waves, do not yield any information concerning the subterranean strata and seriously interfere with proper interpretation of the reflected and refracted waves. Ordinarily, the ground roll has a dominant frequency substantially lower than the reflected and refracted waves. For example, in one section, the surface wave has a dominant period of 10 cycles per second and a velocity of about 400 feet per second. It is a purpose of this invention to provide a band elimination filter for eliminating the undesirable surface waves from the output of the seismometers.

It has been known to be desirable from the early days of the reflection seismograph that the system be tuned so that frequencies between 30 and 70 cycles per second were amplified most strongly. The conventional seismic amplifier includes a variable filter system providing sixteen characteristics for reflection operation and six characteristics for refraction operation. The different characteristics are achieved by two separate filter networks, one being of the low-pass and the other of the high-pass type. Each filter network can be varied by a separate control which shifts the cut-off frequency thereof. The widest response band is achieved by setting the low-pass filter to the highest cut-off frequency and the high-pass filter to the lowest cut-off frequency, and the response band is varied by shifting the cut-off frequencies. In normal operation, a dual section high-pass filter and a single section low-pass filter are employed, an arrangement being provided for cutting out one of the high-pass filter sections and leaving in the circuit only a single high-pass section and a single low-pass section of the filter. This feature permits the inclusion in the amplifier of only the minimum amount of filtering necessary for a given problem. Wherever possible, the longer transient responses caused by very steep response characteristics are eliminated, thus achieving seismograms with sharp, short duration reflections having a minimum number of oscillations.

Desirably, the aforementioned low-pass filter causes the gain of the amplifier to fall off only slowly up to some frequency between 30 and 70 cycles and then to fall off at higher and higher rates as the frequency increases. The gain of the amplifiers can be 100 times higher below 70 cycles than at 150 cycles, the frequency at which the gain drops off usually being controlled by the field operator according to his judgment. The high-pass filter can be adjusted to pass all frequencies above about 30 cycles. The combined result is to give a band pass filter with independently adjustable upper and lower cut-off frequencies. The cut-off frequencies are not made too sharp, to avoid adding too many extra oscillations to the wavelets reflected from the subsurface.

Observation with equipment designed to record the total motion of the ground shows that the surface of the ground carries a low frequency and low linear velocity, two-dimensional wave. For instance, at the North Burbank field, the surface wave has a dominant frequency of 10 cycles and a velocity of about 400 feet per second. The period of the waves is very nearly 0.1 second from 0.5–1.5 seconds, which is the useful portion of the record.

In accordance with my invention, this nearly constant period enables the ground wave to be eliminated by a band elimination filter to attenuate the dominant frequency of the ground roll. By placing a band elimination filter tuned to the ground roll frequencies before the amplifier, I have obtained a very substantial improvement in the quality of the records. The frequency range over which it is necessary to have high attenuation is rather small, an adjustable circuit with high attenuation at frequencies from 5 cycles per second to 25 cycles per second being suitable.

It is an object of the invention to provide an improved tuning system for the elimination of surface waves in seismic recording.

It is a further object to provide such a system in which a band elimination filter cooperates with the filter circuits of the seismic amplifier to eliminate the surface waves without adversely affecting the characteristics of the desired reflected and refracted waves.

It is a still further object to provide a system which is reliable in operation and utilizes a minimum number of standard circuit components.

Various other objects, advantages and features of the invention will become apparent from the following detailed description taken in conjunction with the accompanying drawings, in which.

Figure 1:
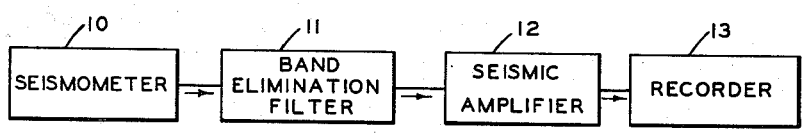
Figure 1 is a block diagram of my novel seismic system.

Referring now to Figure 1, the output of a seismometer 10 is fed through a band elimination filter 11 to a seismic amplifier 12 and, thence, to a recorder 13. The amplifier 12 includes a high-pass filter and a low-pass filter which are adjustable so that signals having the dominant frequencies of the reflected and refracted waves pass readily through the amplifier while other frequency ranges are attenuated. For example, amplifier 12 can be adjusted to pass all frequencies between 30 and 70 cycles while signals of higher or lower frequencies are attenuated. In order to avoid undesirable attenuation of the desired signals and distortion thereof, the amplifier filter does not cut-off the signals of higher and lower frequencies too sharply so that considerable energy of frequencies lower than the lowest desired frequency can pass through the seismic amplifier to the recorder. In accordance with the invention, band elimination filter 11 is tuned to sharply reject signals having a dominant frequency lower than that of the reflected and refracted waves. This filter has its frequency of maximum rejection at the dominant frequency of the surface waves, for example, between 5 and 25 cycles per second. In the North Burbank field, for example, the surface waves have a dominant frequency of 10 cycles and, accordingly, filter 11 is tuned so that its maximum rejection occurs at a frequency of 10 cycles per second. In this manner, the undesired surface waves are eliminated from the recording without the substantial distortion or attenuation of the desired reflected and refracted waves.

I have discovered that a filter of the Campbell frequency bridge type is particularly adapted for use as the band elimination filter 11. Although it is to be understood that the broad aspects of this invention comprehend the use of other types of band elimination filters, the modified Campbell frequency bridge filter described herein is considered to be peculiarly suited for use in the combination of my invention. The modified filter circuit utilized in my invention is shown diagrammatically in Figure 2 as including a signal source 14 connected in series with a resistance 15, a condenser 16, a winding 17 of a mutual inductance 18 and a condenser 19. The output circuit of the filter comprises a second winding 20 of mutual inductance 18, the condenser 19 and the cathode-grid circuit of a tube 21. The values of the current, voltage and circuit components are as indicated on the diagram.

The symbols in the equations hereafter set forth have the following meanings:

$e$ = voltage output of the filter.
$C_0$ = capacity of $C_0$.
$C_1$ = capacity of $C_1$.
$L_1$ = self inductance of the primary coil.
$L_2$ = self inductance of the secondary coil.
$M$ = the mutual inductance and $= \sqrt{L_1 L_2}$.
$i$ = current in time $t$.
$t$ = instantaneous value of time.
$f$ = frequency at which $e=0$ or the frequency which is attenuated.

Figure 2:
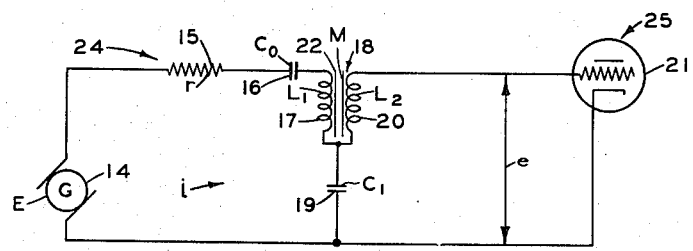
Figure 2 is a schematic circuit diagram of a simplified version of the band elimination filter.

It is easiest to understand this circuit from the equivalent diagram of Figure 2. The voltage $e$ is approximately as follows:

$$e = M \frac{di}{dt} + \frac{1}{C_1} \int_{-\infty}^{t} i \, dt \quad (1)$$

In other words, $e$ is a constant $M$ times the derivative of the primary current plus a constant $$\frac{1}{C_1}$$

times the integral of the current up to the instant of observation. Now if the primary current is given by $$i = a \sin wt$$

$$M \frac{di}{dt} = Maw \cos wt \quad (2)$$

$$\frac{1}{C_1} \int_{-\infty}^{t} a (\sin wt) dt = \frac{-a}{C_1 w} \cos wt$$

$$Maw \cos wt - \frac{a}{C_1 w} \cos wt = e$$

$$a \cos wt \left( Mw - \frac{1}{wC_1} \right) = e \quad (3)$$

$$e = 0 \text{ when } Mw = \frac{1}{wC_1}$$

$$w^2 = \frac{1}{MC_1} \quad w = 2\pi f$$

$$w = \frac{1}{\sqrt{MC_1}}$$

$$f = \frac{1}{2\pi \sqrt{MC_1}}$$

Thus the voltage will be zero at a frequency determined by Equation 3. If the current $i$ is proportional to the true ground motion, then we see from Equations 1 and 3 that if the basic wavelength which represents the ground motion due to the reflected energy consists mostly of high frequency energy, then the voltage $e$ will be proportional to the derivative of the basic wavelength with a small term added proportional to the integral of the basic wavelength. In practice, this circuit removes the ground roll with less change in appearance of the reflected wave than is obtained with the usual high-pass filter.

As a result, the frequency $w$ of Equation 3 is the frequency of maximum attenuation and this frequency is set to the dominant frequency of the undesired surface waves so that they are substantially or completely eliminated from the seismometer output before it is fed to the seismic amplifier, this attenuation occuring with a minimum attenuation and distortion of the desired seismic signals which are, in general, of higher frequency than the surface waves.

I have discovered that coil losses in the mutual inductance are substantially reduced with the result that a very high rejection is obtained when the inductances 17, 20 are wound upon an iron core. That is, a circuit of very high Q is provided and the hysteresis effects due to the iron core are not serious at the frequencies utilized in seismic prospecting. Accordingly, I have provided an iron core 22 as part of the mutual inductance 17. The use of this iron core provides unexpectedly good results when the filter is used in a band elimination circuit to eliminate surface waves in a seismic prospecting system.

Figure 5:
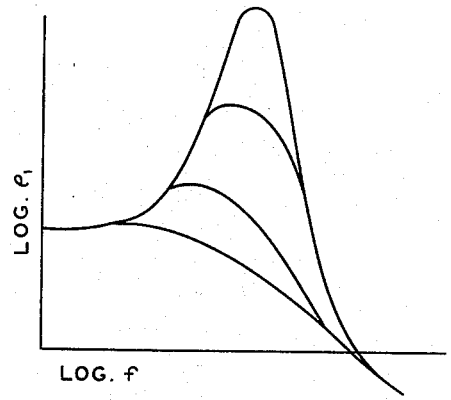
Figures 5 to 8, inclusive, are graphs illustrating features of the invention.
Figure 6:
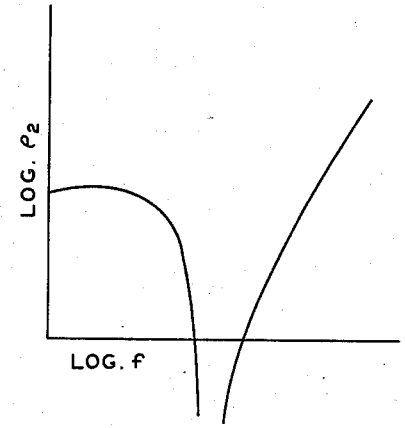
Figure 7:
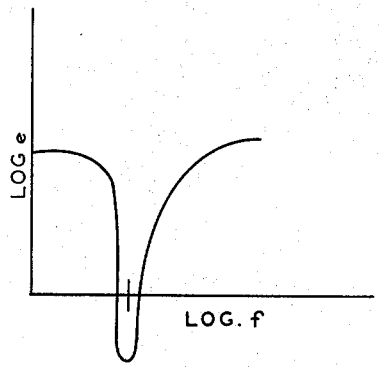

As stated, the filter of Figure 2 provides a very sharp elimination band with little effect on signals of frequencies outside this band. Moreover, the input portion 24 of the circuit can be separately adjusted by changing the value of resistance 15, condenser 16 or inductance 17 and the output circuit 25 can be separately adjusted at the same time by changing the value of condenser 19, this latter adjustment shifting the entire elimination band of the filter to a higher or lower frequency without appreciable changing of the filter characteristics. Thus, by changing the parameters of circuit 24, the characteristics shown in Figure 5 are obtained by the circuit 24 and the characteristics shown by Figure 6 are obtained by the circuit 25. It can be demonstrated mathematically that, if circuit 24 is tuned to a frequency slightly lower than is the circuit 25, the overall characteristic of the filter is as shown in Figure 7, which can be obtained by algebraically adding a selected curve of Figure 5 to the curve of Figure 6. It will be noted that this overall filter characteristic has a very sharp rejection band while signals of higher or lower frequencies than the rejected band are substantially unattenuated. In contrast, if the circuit 24 is tuned to a higher frequency than circuit 25 by adjustment of the parameters of the circuits, the characteristic shown in Figure 8 can be readily obtained. It will be noted from this figure that the frequency characteristic rises beyond the rejection frequency of the filter.

Figure 3:
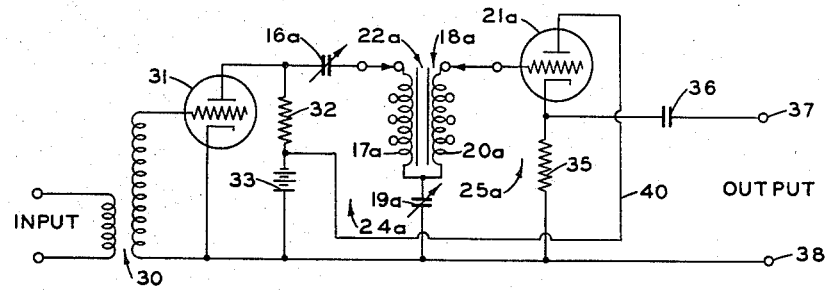
Figure 3 is a schematic circuit diagram of a practical circuit utilizing the principle described in connection with Figure 2.

Referring now to Figure 3, I have shown a practical circuit embodying the rejection filter of Figure 2. In this circuit, a seismometer signal is fed to the primary winding of a transformer 30, the secondary winding of which is connected between the grid and cathode of a tube 31. The anode-cathode circuit of this tube includes an isolating resistance 32 and a battery or other current source 33. The anode of the tube 31 is connected to the filter circuit which includes components 16a to 21a, inclusive, corresponding to similarly numbered components of the circuit of Figure 2. It will be noted that the windings 17a, 20a are provided with suitable taps so that the inductance can be varied while units 16a and 19a are shown as variable condensers to permit adjustment of the circuit parameters. The resistance 15 of Figure 2 corresponds to the resistance of the inductance and other parts of the circuit 24a while the generator 14 of Figure 2 corresponds to the driving circuits of Figure 1 which includes the transformer 30 and tube 31. In Figure 3 the cathode of tube 21a is connected to ground by a resistance 35 and through a condenser 36 to an output terminal 37, the other output terminal 38 being grounded. The anode of tube 21a is connected by a lead 40 to the positive terminal of battery 33 to provide operating potential for the tube.

Figure 8:
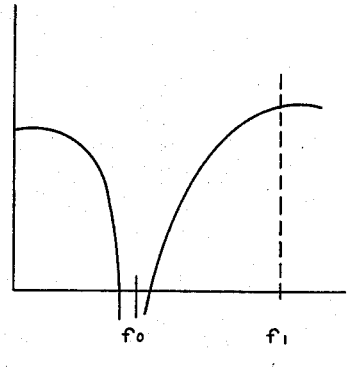

When seismic signals are fed to transformer 30, the filter eliminates signals whose dominant frequency lies within the cut-off range of the filter as illustrated in Figures 7 and 8. In the case of seismic signals, the filter is tuned to reject the dominant frequency of the surface waves.

In this circuit, adjustment of the inductance of winding 17a or 20a shifts the resonant frequency of the corresponding circuit 24a or 25a while, at the same time, changing the elimination band of the filter. Adjustment of condenser 19a also changes the elimination band of the filter while adjustment of condenser 16a changes the characteristics of circuit 24a without changing the characteristics of circuit 25a, as illustrated in Figures 5 and 6. Thus, the filter has a sharp rejection band, the width of which is readily adjustable as well as the sharpness of elimination by changing the described parameters of the filter circuit. This enables the surface wave frequencies to be eliminated and compensation to be made for the varying frequencies of surface waves encountered at different locations.

Figure 4:
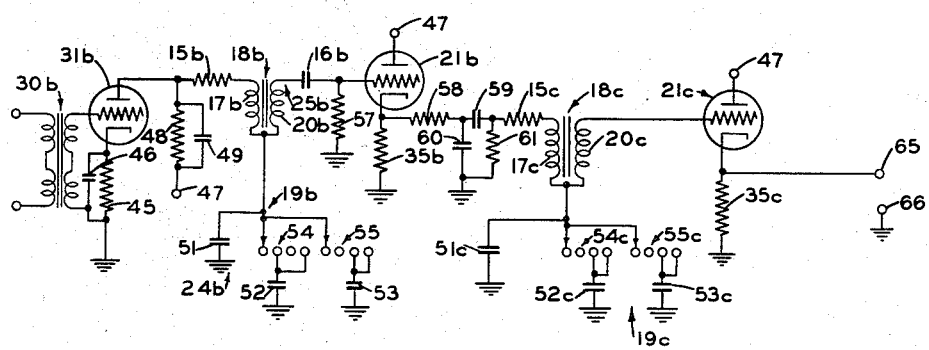
Figure 4 is a schematic circuit diagram of a two-stage band elimination filter.

In Figure 4, I have illustrated a circuit in which the band elimination filter comprises two stages. Parts similar to those already described are indicated by like reference numbers with different reference letters. In this circuit, seismic signals are fed to the primary winding of transformer 30b, the secondary winding of which is connected between the grid of tube 31b and ground, the cathode of this tube being connected to ground through a resistance 45 shunted by a condenser 46, and the anode of tube 31b being connected to a positive power supply terminal 47 through a resistance 48 shunted by a condenser 49. The anode of this tube is also connected through a resistance 15b to the filter circuit as described in Figures 2 and 3, with the difference that condenser 16b forms a part of circuit 24b rather than circuit 25b. In this circuit, moreover, the variable condenser 19b is replaced by a unit providing a stepwise variation of capacitance, this unit incorporating fixed condensers 51, 52 and 53 together with switches 54 and 55, the switches being adjustable to permit stepwise variation in the capacitance of the unit 19b. The control grid of tube 21b is connected to ground through a fixed resistance 57, while its cathode is connected to a fixed resistance 58 and a condenser 59 to the second filter stage, a grounded condenser 60 being connected to the junction between the resistance 58 and condenser 59 and a grounded fixed resistor 61 being connected to the input of the second filter stage. The second filter stage includes the resistance 15c and other components corresponding to those already indicated, the cathode of tube 21c being connected to an output terminal 65, and the other output terminal 66 being grounded. The described two stage filter circuit permits a sharper rejection band to be obtained and somewhat increases the flexibility of the filter circuits in that a greater number of adjustable components is provided.

While the invention has been described in connection with present, preferred embodiments thereof, it is to be understood that this description is illustrative only and is not intended to limit the invention, the scope of which is defined by the appended claims.

I claim:

1. A seismic prospecting system comprising, in combination, a seismometer, a band elimination filter fed by said seismometer including an iron core, a mutual inductance wound on said core, said inductance including two windings, a lead interconnecting one terminal of each winding, a circuit including one winding, said lead, and a first condenser, a second circuit including said second winding, said condenser, and a second condenser, means for feeding the output of said seismometer to one of said circuits, the components of the circuit conforming to the equation $$f = \frac{1}{2\sqrt{MC}}$$

where $f$ is a frequency within the range of 5 to 15 cycles per second where ground roll signals to be attenuated have their dominant frequency, M is the ratio of the self inductance of said windings, and C is the capacitance of said first condenser, and a seismic amplifier connected to the other of said circuits, said amplifier being constructed and arranged to pass all frequencies between 30 and 70 cycles per second while signals of higher or lower frequencies are attenuated, said amplifier having a cut-off characteristic sufficiently broad that distortion of the desired signals is avoided and considerable energy of frequencies lower than 30 cycles per second can pass through the amplifier.

2. The seismic prospecting system of claim 1 wherein the band elimination filter is sharply tuned to reject signals having a frequency of about 10 cycles per second.

References Cited in the file of this patent

UNITED STATES PATENTS

| | | |
|---|---|---|
| 1,613,952 | Johnson | Jan. 11, 1927 |
| 1,624,665 | Johnson et al. | Apr. 12, 1927 |
| 1,945,427 | Farnham | Jan. 30, 1934 |
| 2,296,098 | Farfel et al. | Sept. 15, 1942 |
| 2,310,323 | Sharp | Feb. 9, 1943 |
| 2,355,826 | Sharpe | Aug. 15, 1944 |
| 2,373,601 | Robinson | Apr. 10, 1945 |
| 2,404,270 | Bradley | July 16, 1946 |
| 2,420,672 | Maillet | May 20, 1947 |
| 2,449,148 | Sands | Sept. 14, 1948 |
| 2,452,515 | Athy | Oct. 26, 1948 |
| 2,503,155 | Harvey et al. | Apr. 4, 1950 |
| 2,660,712 | Landon | Nov. 24, 1953 |

FOREIGN PATENTS

| | | |
|---|---|---|
| 959,693 | France | Oct. 10, 1949 |